United States Patent [19]

Person et al.

[11] 4,039,177
[45] Aug. 2, 1977

[54] HEAVE COMPENSATION APPARATUS FOR A MARINE MINING VESSEL

[75] Inventors: Abraham Person, Los Alamitos; Vance E. Bolding, Redondo Beach, both of Calif.

[73] Assignee: Global Marine Inc., Los Angeles, Calif.

[21] Appl. No.: 643,555

[22] Filed: Dec. 22, 1975

Related U.S. Application Data

[62] Division of Ser. No. 479,093, June 13, 1974, Pat. No. 3,943,868.

[51] Int. Cl.² .............................................. F16F 9/342
[52] U.S. Cl. ...................................... 267/126; 92/10; 92/143; 188/289
[58] Field of Search ............. 267/65 R, 126; 188/289; 92/10, 143, 8, 110, 52; 244/104 FP

[56] References Cited

U.S. PATENT DOCUMENTS

| | | | |
|---|---|---|---|
| 3,595,349 | 8/1971 | Ortheil | 188/289 |
| 3,687,013 | 8/1972 | Haller | 92/8 |
| 3,696,712 | 10/1972 | Sung | 92/52 |

*Primary Examiner*—George E. A. Halvosa
*Assistant Examiner*—Sherman D. Basinger
*Attorney, Agent, or Firm*—Christie, Parker & Hale

[57] ABSTRACT

A ship in which a string of heavy pipe is raised or lowered vertically beneath the ship at a substantially constant velocity in spite of heaving movement of the ship. The equipment for raising and lowering the pipe string is supported by the vessel through a heave compensation mechanism that permits vertical movement of the ship relative to the pipe raising and lowering mechanism. The heave compensation mechanism is a passive damped pneumatic-hydraulic spring system for isolating the vertical movement of the ship from the pipe raising and lowering equipment. The spring system operates over a very wide range of load imposed by the raising, lowering and supporting of a very long heavy pipe string.

2 Claims, 7 Drawing Figures

HEAVE COMPENSATION APPARATUS FOR A MARINE MINING VESSEL

CROSS REFERENCE TO RELATED APPLICATIONS

This is a division of application Ser. No. 479,093, filed June 13, 1974, and now issued as U.S. Pat. No. 3,943,868.

FIELD OF THE INVENTION

This invention relates to heave compensation means for supporting a variable load on a marine vessel, and more particularly to a heave compensation system which isolates the load from the vertical movement or heave of the marine vessel.

Background of the Invention

In copending applications Ser. No. 479,092, filed June 13, 1974, entitled "Deep Ocean Mining Ship," by John R. Graham and Robert C. Crooke, inventors now issued as U.S. Pat. No. 3,919,958, and Ser. No. 479,091, filed June 13, 1974, entitled "Apparatus for Raising and Lowering Pipe String From a Floating Vessel," by Robert C. Crooke and Abraham Person, inventors now abandoned, both assigned to the same assignee as the present invention, there is described a marine vessel equipped to carry out subsea mining operations on the ocean floor in ocean depths of 3 to 4 miles. The mining equipment is lowered to the ocean floor from the surface vessel by means of an assembled string of pipe which is lowered section by section at substantially constant velocity by equipment supported on the deck of the vessel. Because the increasing load of the mining equipment on the string of pipe as more and more sections of pipe are added to reach these great depths, it is necessary to raise and lower the pipe at substantially constant velocity to avoid the very large forces that would be encountered in a rapid acceleration or deceleration of the pipe string. This constant velocity feed is accomplished, as described in the copending applications, by isolating the equipment that raises and lowers the pipe string from the vertical motions experienced by the floating vessel from which the mining equipment is supported.

The problem of supporting a string of pipe from a floating vessel is also encountered in carrying out subsea oil drilling operations and various schemes have heretofore been proposed for isolating the drill stem from vertical movements of the floating vessel. Such known arrangements for isolating the drill stem from the vertical movements of the supporting vessel have required some stable point of reference, such as a cable, riser, or other equipment which is anchored to the ocean floor. A servo-operated mechanism which senses vertical movements of the vessel relative to the reference adjusts the linkage between the vessel and the pipe string to provide compensating adjustment in the supporting structure.

Summary of the Invention

The present invention is directed to heave compensation means which is passive in its operation and requires no reference connected to the ocean floor. Rather, the present invention is directed to a passive damped spring arrangement for supporting the pipe feed mechanism and associated pipe string from the deck of the vessel. The stiffness of the spring system, the damping and natural frequency can be controlled to provide effective isolation of the load from the periodic and transient vertical movements of the vessel even though the load varies over a very wide range as does the period and amplitude of the vertical motions of the supporting vessel.

This is accomplished in brief by providing a stable platform which is supported from and vertically movable in relation to the deck of a floating vessel. Load transfer between the platform and the vessel is through hydraulic rams. The hydraulic rams in turn are connected to accumulators in which the hydraulic fluid from the ram interfaces with a volume of pressurized gas. The volume of pressurized gas in turn is pneumatically connected to a plurality of pressurized gas containers through valving means which permit the number of containers connected into the system at any one time to be controlled. The accumulators are also connected to a compressor for controlling the amount of gas in the system.

BRIEF DESCRIPTION OF THE DRAWINGS

For a more complete understanding of the invention reference should be made to the accompanying drawings, wherein.

DETAILED DESCRIPTION

Figure 1:
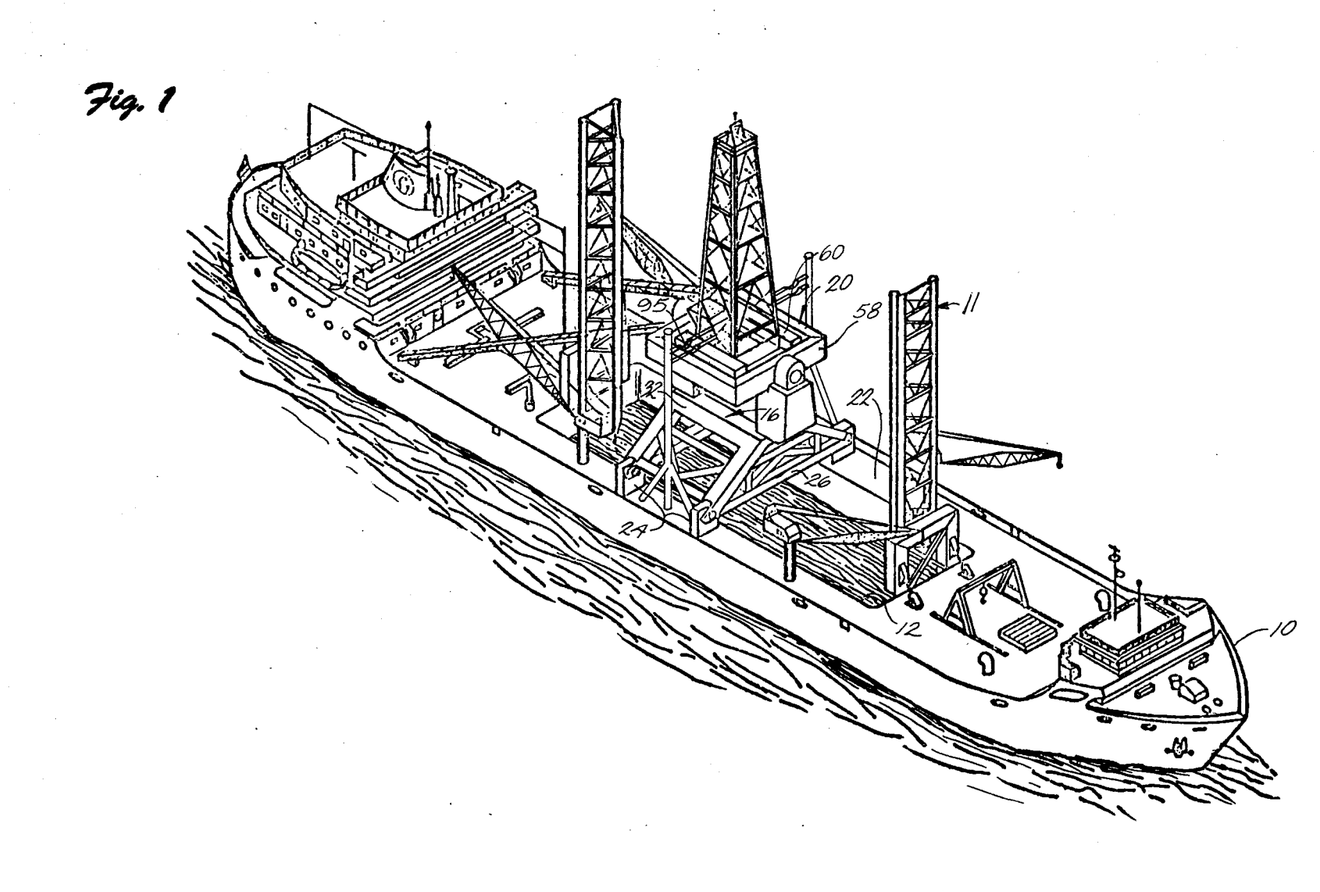
FIG. 1 is a perspective view of a vessel incorporating the features of the present invention.

Referring to FIG. 1, the numeral 10 indicates generally a ship designed to incorporate the features of the present invention for use in subsea mining operations. The ship is provided with a moon pool 12 located amidships which gives access to the water and the ocean floor. Mining equipment (not shown) can be stored in the large opening of the moon pool during transit and can be lowered from the moon pool 12 to the ocean floor by a string of pipe which is assembled in sections and raised or lowered by a pipe-handling system. The pipe-handling system includes an A-frame base 16 which bridges the moon pool 12 amidships of the vessel 10. A derrick 18 is supported over the moon pool on the A-frame 16 through a gimbal system 20 which permits the derrick to maintain a vertical position even though the ship may be rolling or pitching.

Figure 2A:
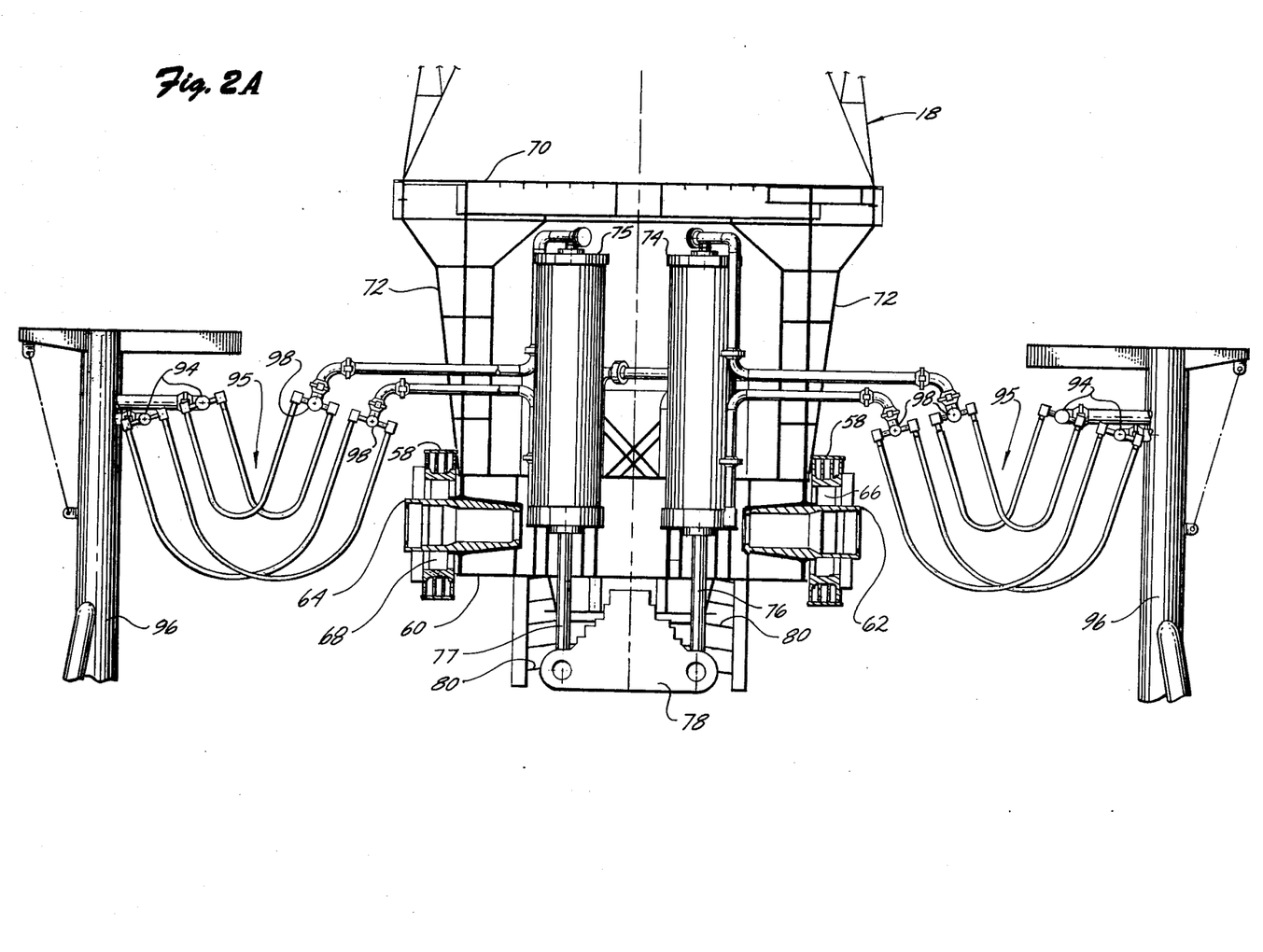
FIGS. 2A and 2B together provide a sectional view taken athwartships showing details of the pipe-handling system.
Figure 2B:
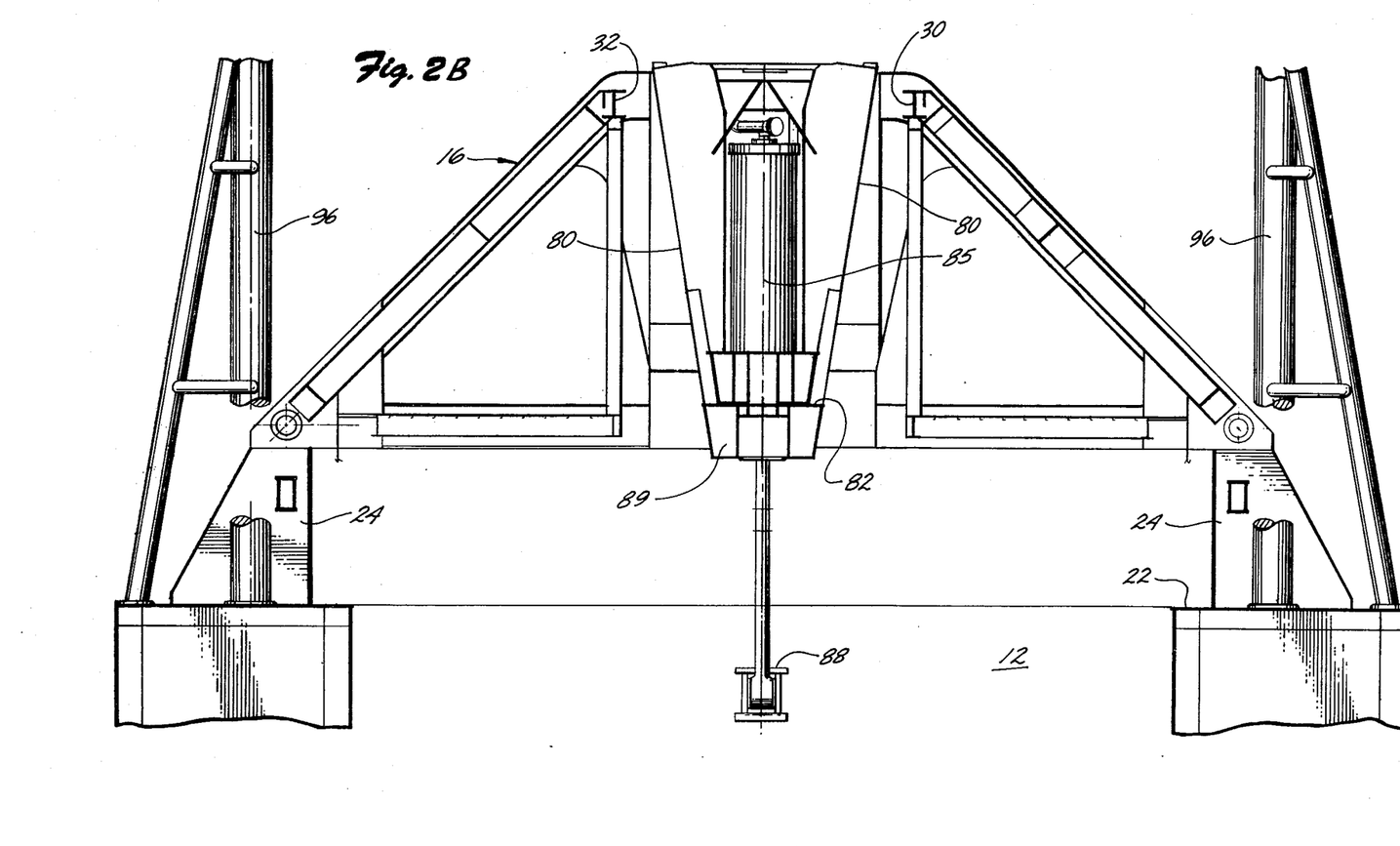
Figure 3:
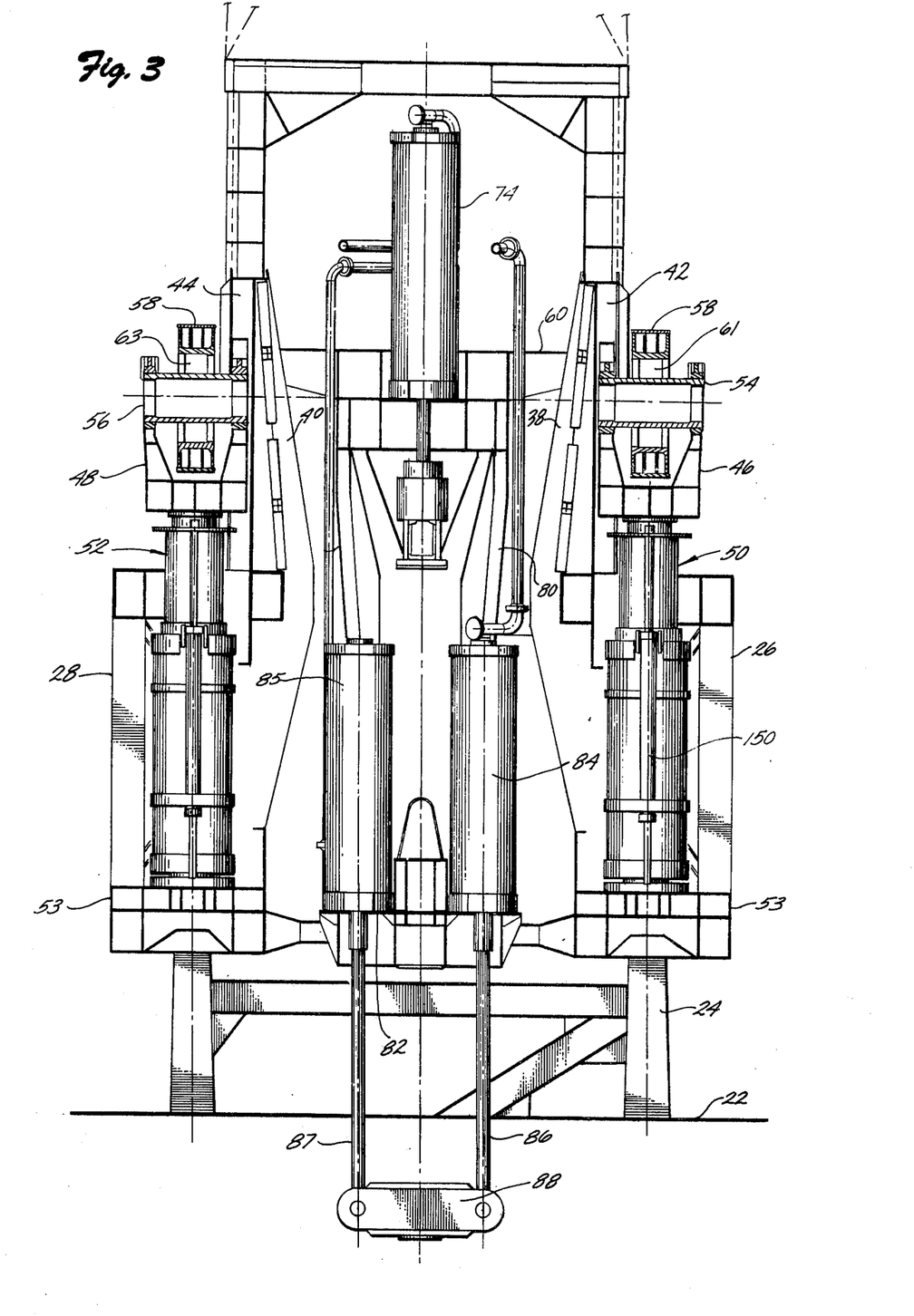
FIG. 3 is a partial sectional view taken in a fore and aft direction of the ship showing details of the pipe-handling system.

Referring to FIGS. 2 and 3, the pipe-handling system 14 is shown in greater detail. The A-frame 16 is supported from the main deck 22 of the ship 10 by four support pedestals 24. The A-frame support structure 16 includes a pair of end trusses 26 and 28 which bridge the moon pool between the support pedestals 24. The trusses 26 and 28 are tied together by horizontal girders 30 and 32 adjacent the top of the trusses, the girders 30 and 32 being spaced apart to leave an opening through which the lower end of the derrick structure 18 extends.

To provide heave compensation, the gimbal system 20 on which the derrick 18 is mounted is supported on the A-frame 16 by an arrangement which permits relative vertical movement between the ship 10 and the gimbal system 20 on which the derrick is supported. As seen in FIG. 3, the trusses 26 and 28 have vertically extending frame members 38 and 40 which provide vertically extending guide surfaces 42 and 44, respectively. Movable in the guide surfaces 42 of the frame member 38 is a gimbal bearing yoke 46, while a similar gimbal bearing yoke 48 is vertically movable in the guide surface 44 of the frame member 40. Heave compensating rams, indicated generally at 50 and 52, provide an adjustable support, in the manner hereinafter described in more detail, between the bottom of the yokes 46 and 48 and a base frame portion 53 of the trusses 26 and 28 of the A-frame structure 16.

The yokes 46 and 48 respectively support axially aligned shafts 54 and 56 on which are journaled the outer gimbal frame 58 by means of bearings 61 and 63. As best seen in FIG. 1, the outer gimbal frame 58 is an open rectangular structure. An inner gimbal frame 60 is in turn supported within the outer gimbal frame 58 by means of coaxial stub shafts 62 and 64. These shafts are journaled in bearings 66 and 68 mounted on opposite sides of the outer gimbal frame 58. The derrick 18 is supported on the top of the inner gimbal frame 60. As shown in FIG. 2A, the derrick includes a rig floor 70 which in turn is supported on four legs 72 at each of the corners to the top of the inner gimbal frame 60.

Supported below the derrick floor 70 within the inner gimbal ring 60 and extending down into the opening through the A-frame support 16 is the heavy lift equipment by means of which a pipe string can be raised and lowered through the moon pool to and from the ocean floor. This heavy lift equipment includes a pair of upper hydraulic cylinders 74 and 75 mounted on the inner gimbal frame 60 on either side of the vertical centerline along which the pipe string is raised and lowered. See FIG. 3. The cylinders 74 and 75 operate vertically extending piston rods 76 and 77 which extend downwardly and are joined at their lower ends to a bridging upper yoke assembly 78. The upper yoke assembly 78 includes hydraulically operated means for releasably supporting the pipe string at a pipe joint so that hydraulic actuation of the upper cylinder 74 and 75 imparts vertical movment to the pipe string.

Extending down beneath and supported from the inner gimbal frame 60 is an open cage structure 80 which terminates at its lower end in a platform 82 on which is mounted two lower hydraulic cylinders 84 and 85. The lower hydraulic cylinders are positioned fore and aft of the vertical centerline, whereas the upper hydraulic cylinders 74 and 75 are located to starboard and port of the vertical axis. The lower cylinders 84 and 85 actuate piston rods 86 and 87 which are coupled at their lower ends to a lower pipe supporting yoke assembly 88. Like the upper yoke assembly 78, the lower yoke assembly 88 is also arranged to releasably engage the pipe string at a pipe joint. Thus, hydraulic actuation of the lower cylinders 84, 85 likewise is capable of imparting a lowering or raising motion to the pipe string. The lower end of the cage structure 80 is provided with ballast for the purpose of lowering the center of gravity of the derrick and associated heavy lift system to a point below the plane of the gimbal axes. The derrick therefore tends to ride in a vertical position within the gimbal support under the influence of gravity, substantially isolated from the rolling and pitching movement of the ship. The pipe string load in the derrick structure further enhances this result.

Figure 4:
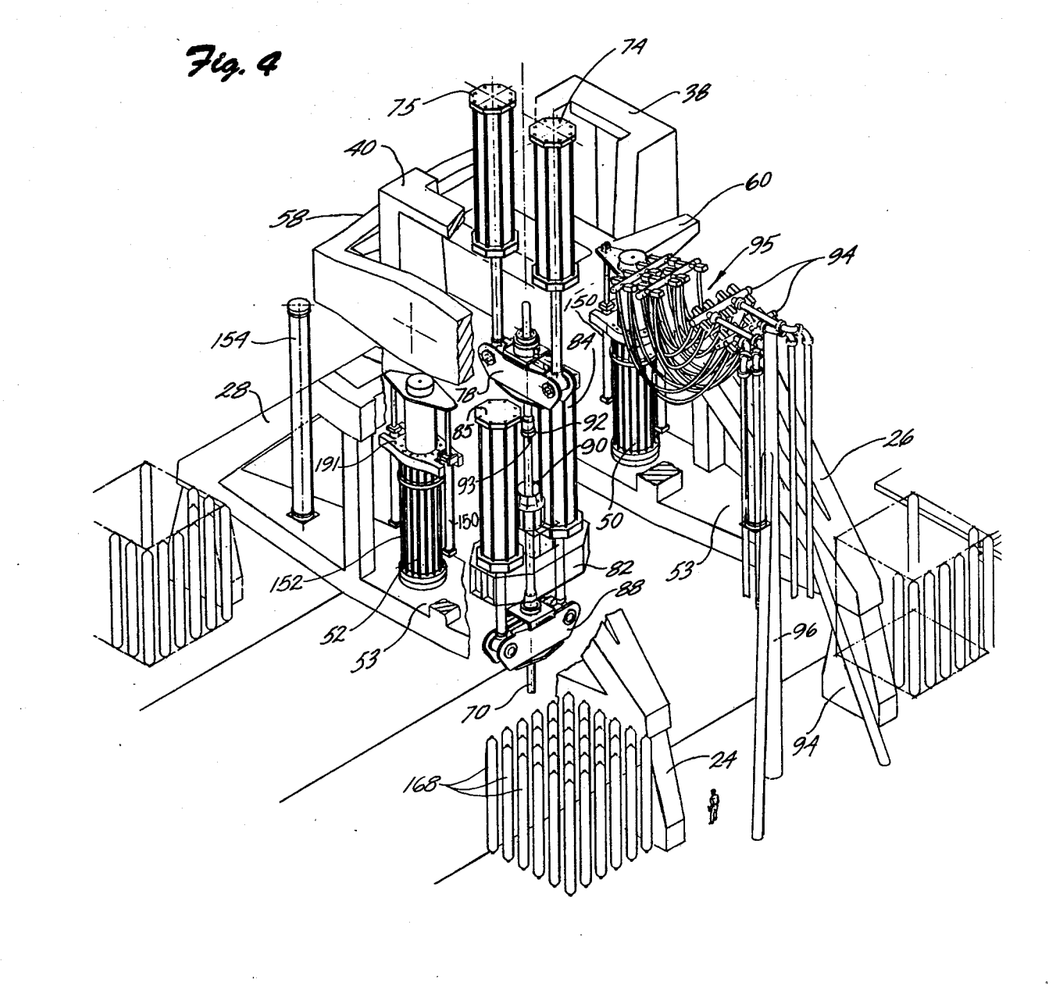
FIG. 4 is a perspective view, partially cut away, of the heavy lift system and heave compensation system.

Referring to FIG. 4, the heave compensation and heavy lift system are shown in perspective. The pipe string is indicated at 90. The pipe string is made up of a plurality of detachable sections, each section having an internally threaded collar 92 at the upper end of the pipe section in which another pipe section is stabbed and threaded into a locked position. The collar 92 of each section provides a shoulder 93 by means of which the load imposed by the pipe string can be transferred to either the upper yoke 78 or lower yoke 88.

Hydraulic power for the operation of the heavy lift cylinders 74, 75 and 84, 85 is provided from hydraulic pumps (not shown) through flexible lines 95 extending from manifolds 94 mounted on the top of supports 96 extending from the deck 22 on either side of the moon pool. The lines connect to manifolds mounted on the inner gimbal structure. The flexible hoses permit free movement of the gimbal system.

To minimize dynamic stresses in the pipe string, a heave compensation system is provided which permits relative motion between the gimbal platform and the vessel, while providing a load transfer path between the vessel and the gimbal platform. As pointed out above in connection with FIG. 4, the entire gimbal structure, including the outer gimbal 58 and inner gimbal 60, is supported on a pair of rams 50 and 52 which are part of the heave compensation system. Associated with each of the rams are a pair of hydraulic cylinders 150 and 152, respectively, which operate in synchronism with the rams 50 and 52. As hereinafter described in detail, these cylinders are used to support the load imbalance between the two rams and to maintain the fore and aft axis of the gimbal system parallel with the deck of the vessel.

Figure 5:
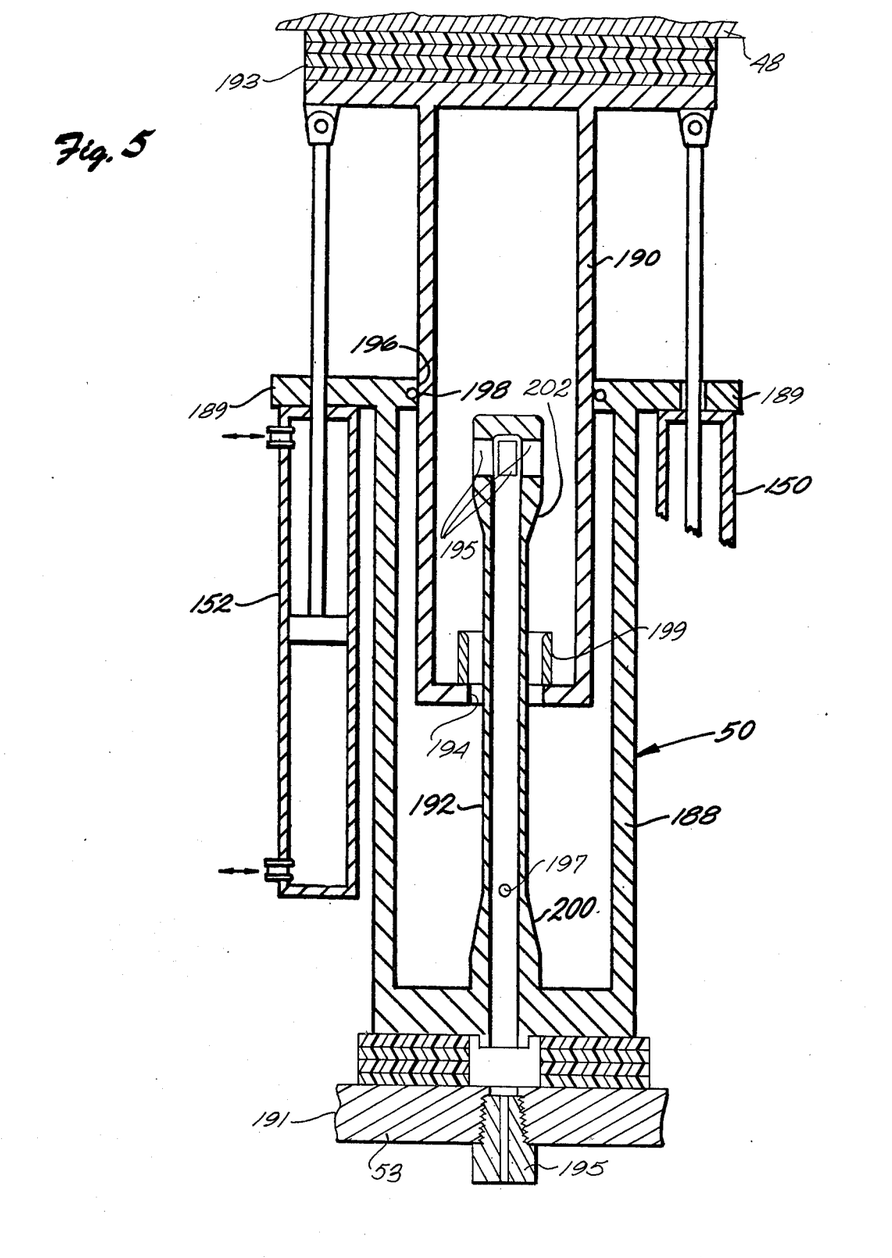
FIG. 5 is a detailed sectional view of the heave compensating ram.
Figure 6:
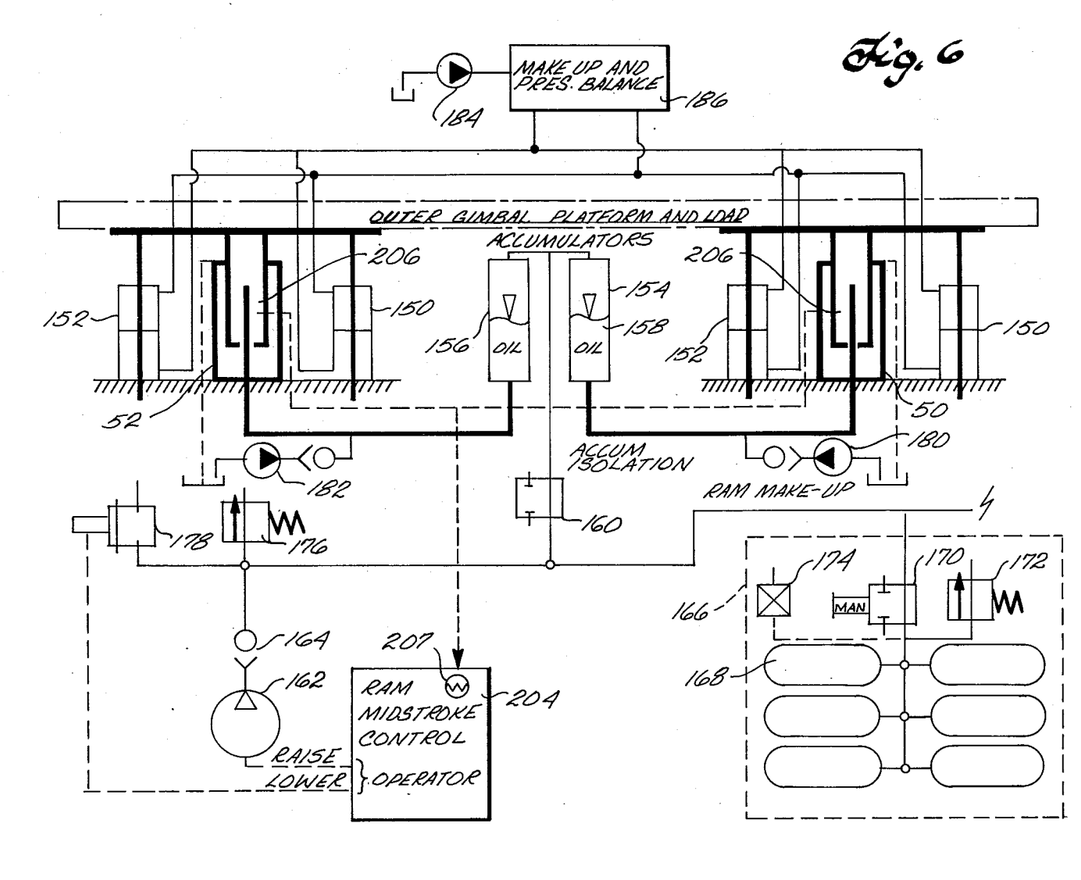
FIG. 6 is a schematic diagram of the hydraulic-pneumatic system of the heave compensator.

Referring to FIG. 6, the heave compensating system is shown schematically. Each of the rams 50 and 52 is in effect a dash pot, hereinafter described in more detail in connection with FIG. 5, which is hydraulically connected to an associated accumulator, indicated respectively at 154 and 156. Each accumulator includes a floating, unsealed piston 158 which separates oil in the bottom half of the accumulator from air in the top half of the accumulator. The top of the accumulators 154 and 156 in turn are connected through a common pneumatic line including an On/Off valve 160 to a compressor 162 through a check valve 164. The compressor 162 pumps more gas into the system to thereby cause the rams, under a given load, to expand and raise the gimbal structure. The output of the compressor is also connected to an air bank consisting of 24 identical sets of six air bottles each, one such set being indicated at 166. As shown in FIG. 4, the air bottles are preferably arranged in four groups of 36 bottles positioned at the four corners of the A-frame support.

The six air bottles of each set are connected through a common manifold and through an On/Off valve 170 to the pneumatic output line from the compressor 162. Each set of air bottles is provided with a pressure-relief valve 172 and a drain valve 174. A system-relief valve 176 is provided on the output of the compressor to limit the maximum pressurization of the system. A remotely operated vent 178 permits venting of the system to reduce the gas in the system and thereby cause the rams 50 and 52, under a given load, to contract and lower the gimbal system.

The load leveling system provided by the cylinders 150 and 152 includes hydraulic lines connecting the hydraulic fluid in the top of the cylinders 150 and 152 associated with ram 50 to the bottom of the cylinders 150 and 152 associated with ram 52 and connecting the bottom of the cylinders 150 and 152 associated with ram 50 to the top of the cylinders 150 and 152 associated with ram 52. Thus, any unbalanced load tending to push one ram down more than the other is distributed to the other ram by the load-leveling system.

Hydraulic pumps 180 and 182 are provided for making up hydraulic fluid in the respective rams 50 and 52. A pump 184 is used to pressurize the load-leveling system through a make-up and pressure-balance control 186. The control 186 includes valve means for controlling the fluid volume of one side or the other to level the system and to adjust for differences in load imposed on the respective rams.

Details of the rams 50 and 52 are shown in FIG. 5. The ram includes two telescoping closed-end cylinders, an outer lower cylinder 188 and an inner upper cylinder 190. Functionally, the upper cylinder operates as a piston moving up and down in the lower cylinder. The bottom of the lower cylinder 188 is mounted in the base frame portion 53 of the A-frame 16. A flexible pad 191 of suitable yieldable material is provided between the bottom of the ram and the supporting surface to permit some tilting of the ram on its support. Similarly, the top of the upper cylinder 190 engages the bottom of the yoke 48 that supports the outer gimbal frame 58. A flexible pad 193 of yieldable material is interposed between the top of the ram and the bottom of the yoke to permit some tilting of the ram. Thus the pads 191 and 193 limit any bending movement imposed on the two cylinders of the ram. The leveling cylinders 152 are mounted on either side of the lower outer cylinder 188. The cylinders 152 are attached to flanges 189 projecting from the top of the lower cylinder 188.

Hydraulic fluid is connected from external piping 195 through the bottom of the lower cylinder 188. The pad 191 acts as a gasket to provide a fluid-tight connection at the bottom of the ram to the piping 195. A concentrically positioned tube 192 projects up inside the upper cylinder 190 through an opening 194 in the partially closed lower end of the upper cylinder 190. The inside of the tube 192 is connected through radial slotted openings 195 into the interior of the upper cylinder 190 and through a radial opening 197 into the interior of the lower cylinder 188. A sleeve 199 extends concentrically around the tube 192 and the opening 194. The upper end of the lower cylinder 188 is formed with an opening 196 through which the upper cylinder extends, the opening being provided with suitable sealing means such as one or more O-rings and piston rings 198 for providing a fluid-tight sliding interface at the opening 196 with outer surface of the upper cylinder 190.

In operation, it will be seen that as the load forces the upper cylinder downwardly, fluid is forced from the lower cylinder through the opening 194 into the upper cylinder and out the fluid inlet through the center of the tube 192. Some oil is also forced out the relatively small opening 197. Upward movement of the upper cylinder 190 causes fluid to be drawn from the fluid inlet into the upper cylinder and down through the opening 194 into the interior of the lower cylinder 188. The annular space formed by the opening 194 and the tube 192 restricts the flow of fluid between the upper and lower cylinder, thereby acting to damp the rate at which the system operates.

At the lower end of the outside of the tube 192, an enlarged tapered surface 200 is provided to control the damping at the limit of the stroke of the ram. The tapered surface gradually restricts the area of the annular space as it enters the opening 194, thereby increasing the damping substantially and finally blocking all fluid flow at the extreme lower limit of the stroke. At the upper limit of the stroke, the tapered surface 202 has a similar effect. However, even after the taper blocks off flow through the opening 194, oil still moves to the lower cylinder through the opening 197 but at a greatly restricted rate. Further upward movement causes the sleeve 199 to gradually close off the openings 195 to stop any further upward movement of the upper cylinder 190. This arrangement acts to prevent the rams from producing destructive forces in the event the load on the gimbal system is suddenly lost, as by a break in the pipe string.

Referring again to FIGS. 5 and 6, the ram midstroke control, indicated generally at 204, provides for a manual control of the midstroke or mean level of the rams to prevent the rams from exceeding their working stroke limit. Suitable sensing means, indicated at 206 in each of the rams, provides an electrical signal which indicates the position of the upper cylinder relative to the lower cylinder. This signal is applied to a visual display device 207, such as an oscillograph, at the ram midstroke control 204, permitting the operator to visually monitor the change in position of the rams and to ascertain if the rams are operating in the mid-range of their stroke. The ram midstroke control 204 provides remote control of the compressor 162 and the vent valve 178. Since the mean level of the ram will vary as the applied load is changed due to lifting or lowering of the pipe string or other factors, such as temperature variations which can affect the mean level of the ram stroke, it is necessary for the operator to adjust the system by turning on the compressor 162 from time to time to raise the upper ram cylinders as the load increases, or open the vent valve 178 to lower the upper ram cylinders as the load decreases. It will be understood that the ram midstroke control could be replaced by a servo-system which responds to the mean stroke level and adjusts the system by operating the compressor 162 or vent valve 178 automatically to correct the error between any variation of the mean level from the desired midstroke position of the rams.

The stiffness of the heave compensating system, that is, the amplitude of the stroke of the rams under operating conditions, is controlled by varying the volume of the pneumatic side of the system. This is accomplished by reducing or increasing the number of sets of air banks, such as the set 166, connected in the system at any one time. By opening or closing the vent valve 170 in respective ones of the 24 air bank sets, the volume of the pneumatic system can be varied over a wide range. The operator thereby adjusts the stroke amplitude of the rams under varying conditions to keep the rams operating safely within the stroke limits.

From the above description it will be seen that the present invention provides an arrangement by which a string of pipe, representing a very widely varying load, can be raised or lowered at substantially constant velocity from a heaving vessel. The hydraulic-pneumatic system provides a passive damped spring support for the gimbal-mounted load. The spring constant (stiffness) is adjustable, as is the deflection with load.

What is claimed is:

1. A hydraulic load supporting ram including first and second cylindrical members, one sliding inside the other, the outer ends of the cylindrical members being closed to form a fully enclosed space that varies in volume as the two members move relative to each other, a tube extending into the volume from the outer end of the outer one of the cylindrical members toward the end of the inner member, the tube being rigidly secured at one end to said one cylindrical member and providing a fluid passage connecting the enclosed space to the exterior of the ram, whereby fluid may move into and out of the variable volume defined by the two cylindrical members through the tube, the inner end of the inner cylinder having an end wall transverse to the tube to divide the interior space into two regions, the inner wall having an opening through which the tube extends, the tube having radial openings adjacent the inner end, and means movable with the inner one of said cylindrical members and forming a cylindrical surface concentric with the tube for covering said radial openings with relative movement between the two members to the maximum extension of the ram.

2. Apparatus of claim 1 wherein the tube at adjacent both ends has a diameter slightly less than the diameter of said cylindrical surface and the tube is of smaller diameter over the central portion of its length, the tube being tapered at either end of the central portion to the larger diameter ends.

* * * * *